United States Patent
Fukuoka

(10) Patent No.: US 9,094,626 B2
(45) Date of Patent: Jul. 28, 2015

(54) SOLID-STATE IMAGING DEVICE, METHOD FOR CONTROLLING SOLID-STATE IMAGING DEVICE, AND IMAGING DEVICE

(71) Applicant: OLYMPUS CORPORATION, Tokyo (JP)

(72) Inventor: Naoto Fukuoka, Atsugi (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 13/895,991

(22) Filed: May 16, 2013

(65) Prior Publication Data

US 2013/0308019 A1 Nov. 21, 2013

(30) Foreign Application Priority Data

May 18, 2012 (JP) ................................. 2012-114446

(51) Int. Cl.
H04N 5/335 (2011.01)
H04N 5/361 (2011.01)
H04N 5/378 (2011.01)
(52) U.S. Cl.
CPC ............... *H04N 5/361* (2013.01); *H04N 5/378* (2013.01)
(58) Field of Classification Search
CPC .................................................. H04N 5/23241
USPC .......................................... 348/243, 294, 308
See application file for complete search history.

(56) References Cited

U.S. PATENT DOCUMENTS

| 2004/0036785 | A1* | 2/2004 | Takayanagi | 348/308 |
| 2008/0284888 | A1* | 11/2008 | Kobayashi | 348/308 |
| 2009/0009638 | A1* | 1/2009 | Koizumi | 348/294 |

FOREIGN PATENT DOCUMENTS

JP 2006-049361 A 2/2006

* cited by examiner

*Primary Examiner* — Joel Fosselman
(74) *Attorney, Agent, or Firm* — Westerman, Hattori, Daniels & Adrian, LLP

(57) ABSTRACT

A solid-state imaging device includes a first substrate, a second substrate, connection units that electrically connect the first substrate aid the second substrate, pixels in the first substrate, the pixel including a photoelectric conversion element that converts incident lights to signal charges and accumulates the signal charges, and the pixel outputting pixel signals in accordance with the signal charges, signal lines that supply the second substrate with the pixel signals via the connection units, signal integration units in the second substrate that integrate the pixel signals supplied via the signal lines, and that produce an integrated signal, and signal output units that output the integrated signal.

9 Claims, 8 Drawing Sheets

SOLID-STATE IMAGING DEVICE, METHOD FOR CONTROLLING SOLID-STATE IMAGING DEVICE, AND IMAGING DEVICE

BACKGROUND OF THE INVENTION

1. Field of the Invention

The present invention relates to a solid-state imaging device, a method for controlling a solid-state imaging device, and an imaging device.

Priority is claimed on Japanese Patent Application No. 2012-114446, filed May 18, 2012, the content of which is incorporated herein by reference.

2. Description of Related Art

In recent years, CMOS (Complementary Metal Oxide Semiconductor)-type solid-state imaging devices (hereinafter, referred to as "MOS-type solid-state imaging devices") have attracted attention as a solid-state imaging device and have been put to practical use.

Such MOS-type solid-state imaging device can be driven with a single power supply unlike CM (Charge Coupled Device)-type solid-state imaging devices. In addition, a CCD-type solid-state imaging device requires dedicated manufacturing processes, whereas the MOS-type solid-state imaging device can be manufactured using the same manufacturing processes as those of other LSIs. For this reason, the MOS-type solid-state imaging device easily deals with an SOC (System On Chip), and can realize the multi-functionalization of the solid-state imaging device.

In addition, the MOS-type solid-state imaging device includes an amplifying circuit in each pixel and thus amplifies signal charges within the pixel. For this reason, the MOS-type solid-state imaging device has a configuration which is hardly influenced by noise from a signal transmission path. Further, the MOS-type solid-state imaging device is characterized in that the signal charge of each pixel can be selected and extracted (selection scheme), and the accumulation time or the reading order of signals can be freely controlled for each pixel in principle.

Previously, as exposure types of general MOS-type solid-state imaging devices (hereinafter, also referred to as a "solid-state imaging devices"), a line exposure type and a global exposure type have been known. In the line exposure type, a large number of pixels arrayed two-dimensionally within the solid-state imaging device are exposed at a timing which is different for each row. The line exposure type is a type in which a video signal of a subject is obtained by sequentially reading signal charges generated after performing exposure of a row of a certain unit by the photoelectric conversion element within pixels in the row. In the case of the line exposure type, exposure and reading can be continuously performed in row units. For this reason, it is possible to obtain a video signal of a subject in a state in which the influence of noise generated in an accumulation section that accumulates the signal charge generated by the photoelectric conversion element is suppressed to a minimum. However, when an image of a moving subject is captured in the line exposure type, an image of the subject cannot be correctly captured due to the exposure timing different for each row. Particularly in the line exposure type, there is a problem that the distorted video of the subject is obtained depending on the direction in which the subject moves.

On the other hand, the global exposure type is a type in which all the pixels arrayed two-dimensionally within the solid-state imaging device are exposed at a synchronous timing. In the case of the global exposure type, since all the pixels are exposed at a synchronous timing, there is no problem in that a distorted video is obtained even at the time of capturing an image of the moving subject. However, in the global exposure type, since the signal charge generated by the photoelectric conversion element within the pixel is sequentially read after all of the pixels are exposed, it is difficult to suppress the influence of noise generated in the accumulation unit in the pixels that require a long time until the reading of the signal charge is started after terminating exposure. For this reason, in the global exposure-type solid-state imaging device, a video signal having a large amount of noise is obtained more often than in the line exposure-type solid-state imaging device.

In the global exposure-type solid-state imaging device, a circuit for suppressing the influence of noise generated in the accumulation unit as mentioned above is added to the solid-state imaging device, thereby allowing a video signal to be obtained in which the influence of noise is suppressed to a minimum even in the solid-state imaging device in which the global exposure type is adopted. However, the addition of the circuit which suppresses the influence of noise to the solid-state imaging devise causes problems that the total area of the solid-state imaging devise becomes enlarged and the solid-state imaging devise itself becomes enlarged.

As a technique for solving such problems, for example, Japanese Unexamined Patent Application, First Publication No. 2006-49361 discloses a method of which creating a pixel circuit unit of a MOS-type solid-state imaging device as a pixel circuit chip, whereas creating a signal processing unit as a signal processing chip, and superimposing the chips which are separately created. In the art disclosed in Japanese Unexamined Patent Application, First Publication No. 200649361, the pixel circuit chip and the signal processing chip which are separately created are connected to each other through a bump.

On the other hand, if a picture in a dark place, or a picture of a subject having low illuminance, for example, is taken by the MOS-type solid-state imaging device, the long-time exposure may be performed in order to supply sufficient light quantity to the MOS-type solid-state imaging device. However, if the long-time exposure is performed, the temperature of the MOS-type solid-state imaging device increases, thus, the image deteriorates due to the influence of pixel defects caused by dark currents. Therefore, the correction of the pixel detects caused by dark currents is performed by an image processing later.

Moreover, in the MOS-type solid-state imaging device which includes the chips pasted together as disclosed in Japanese Unexamined Patent Application. First Publication No. 2006-49361, it is often the case that a substrate including photoelectric conversion units (pixel circuit chips) is a backside illumination (BSI) type. Since the substrate including the photoelectric conversion units is the backside illumination type, it is possible to supply a lot of light quantity to the photoelectric conversion units. However, in the backside illumination type, the crosstalk of the charges is large due to its configuration. Therefore, in the MOS-type solid-state image sensor of the backside illumination type, if pixel defects caused by dark currents exist, the defects are enlarged by leaking the charges of the pixel defects to the surrounding pixels in the long-time exposure. and it resulted in the large detects. Since it is difficult to correct these large defects by the image processing later, there is a problem of an increase in image degradation.

SUMMARY OF THE INVENTION

An aspect of the present invention is to provide a solid-state imaging device which is constituted by connecting a plurality of chips with each other and can acquire good images, even if a long-time exposure is performed, without major defects generated by the influence of pixel detects caused by dark currents on peripheral parts, a method for controlling the solid-state imaging device, and an image device.

A solid-state imaging device of a first aspect of the present invention includes a first substrate, a second substrate, connection units that electrically connect the first substrate and the second substrate, pixels in the first substrate, the pixel including a photoelectric conversion element that converts incident lights to signal charges and accumulates the signal charges, and the pixel outputting pixel signals in accordance with the signal charges, signal lines that supply the second substrate with the pixel signals via the connection units, signal integration units in the second substrate that integrate the pixel signals supplied via the signal lines, and that produce an integrated signal, and signal output units that output the integrated signal.

Furthermore, a solid-state imaging device of a second aspect of the present inventions further includes a signal supply control unit that controls a period of time and the number of times that the photoelectric conversion elements generate the signal charges, and sequentially supplies the signal lines with the pixel signals generated by the pixels under the control.

Furthermore, a solid-state imaging device of a third aspect of the present inventions further includes a temperature sensor unit that measures the temperature of the first substrate, wherein the signal supply control unit decides the period of time and the number of times in accordance with the temperature of the first substrate measured by the temperature sensor unit, and supplies the signal lines by the number of times decided with the pixel signals in accordance with the signal charges which the photoelectric conversion elements continue to generate for the period of time decided.

Furthermore, a solid-state imaging device of a forth aspect of the present inventions is that a current source load is connected to the signal line in the first to third aspect.

Furthermore, a solid-state imaging device of a fifth aspect of the present inventions is that the pixel further includes a signal charge accumulation unit that accumulates the signal charges generated by the photoelectric conversion element, a reset unit that resets the signal charges accumulated in the signal charge accumulation unit, a transfer unit that transfers the signal charges to the signal charge accumulation unit, and an amplifying unit that amplifies the signal charges accumulated in the signal charge accumulation unit and outputs the amplified signal charges as the pixel signals in the first to forth aspect.

Furthermore, a solid-state imaging device of a sixth aspect of the present inventions is that the signal integration unit includes a pixel signal amplifying unit that outputs amplified pixel signals generated by amplifying the pixel signals, a pixel signal accumulation unit that is inserted into an input terminal of the pixel signal amplifying unit, and that accumulates the pixel signals supplied to the signal integration unit, and an integration accumulation unit that is inserted between the input terminal and a output terminal of the pixel signal amplifying unit, and that sequentially integrates and accumulates the amplified pixel signals in the first to fifth aspect.

Furthermore, a seventh aspect of the present inventions is a method for controlling a solid-state imaging device, the solid-state imaging device including, a first substrate, a second substrate, connection units that electrically connect the first substrate and the second substrate, pixels in the first substrate, the pixel including a photoelectric conversion element, signal integration units in the second substrate, and signal output units that are connected to the signal integration units, the method including a step of converting incident lights into signal charges and accumulating the signal charges by the photoelectric conversion clement, and outputting pixel signals in accordance with the signal charges to signal lines by the pixel, and the signal lines supplying the second substrate with the pixel signals via the connection units, a step of integrating the pixel signals supplied via the signal lines and forming an integrated signal by the signal integration units, and a step of outputting the integrated signal from the signal output units.

Furthermore, an imaging device of an eighth aspect of the present inventions includes a first substrate, a second substrate, connection units that electrically connect the first substrate and the second substrate, pixels in the first substrate, the pixel including a photoelectric conversion element that converts incident lights to signal charges and accumulates the signal charges, and the pixel outputting pixel signals in accordance with the signal charges, signal lines that supply the second substrate with the pixel signals via the connection units, signal integration units in the second substrate, that integrate the pixel signals supplied via the signal lines, and that tom an integrated signal, and signal output units that output the integrated signal.

One aspect of the present inventions provides a benefit that as solid-state imaging device which is constituted by connecting a plurality of chips with each other and can acquire good images, even if the long-time exposure is performed, without major defects generated by the influence of pixel defects caused by dark currents on peripheral parts, a method for controlling the solid-state imaging device, and an image device are provided.

DETAILED DESCRIPTION OF THE INVENTION

Figure 1:
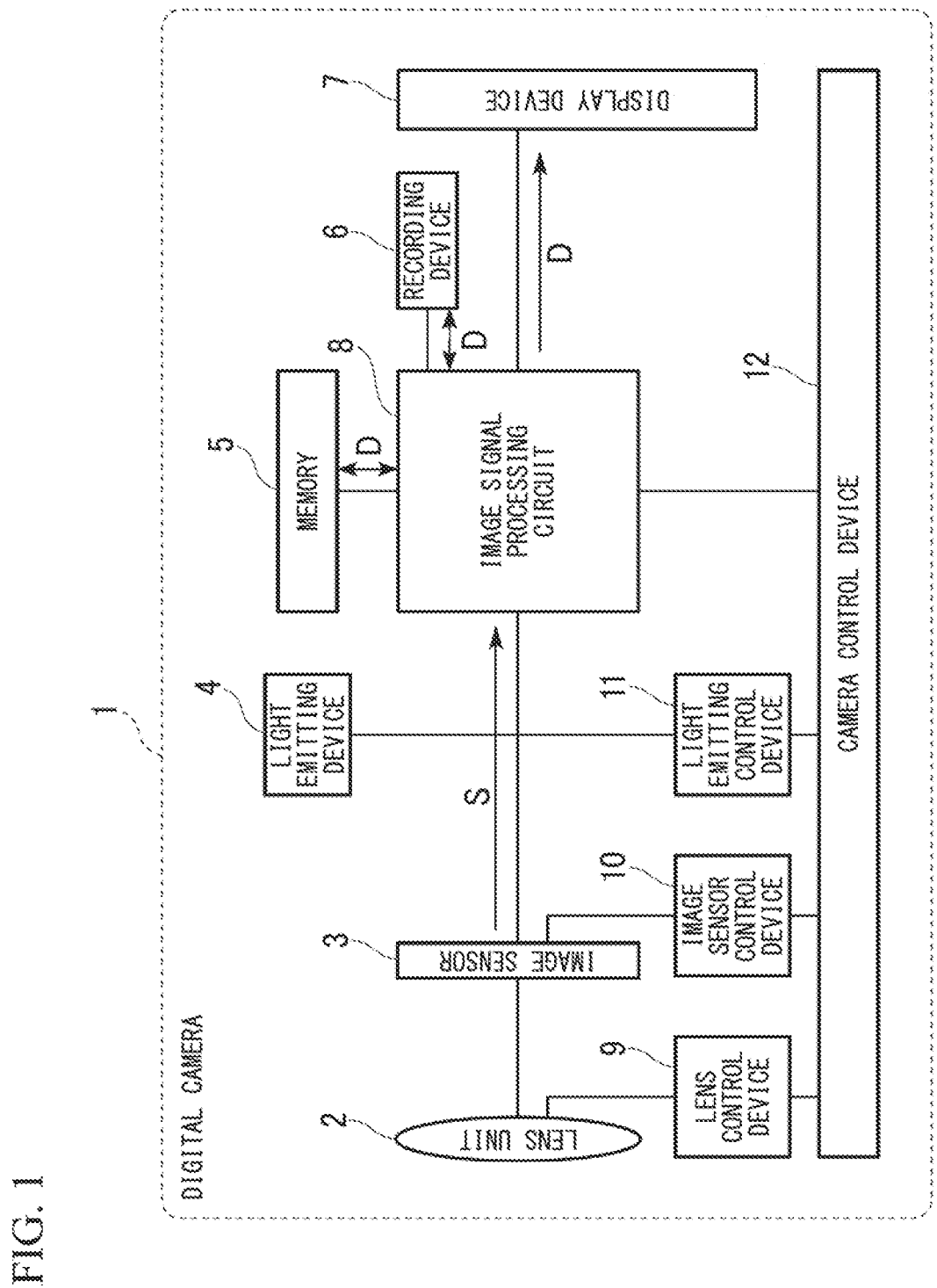
FIG. 1 is a block diagram illustrating an outline of a configuration of a digital camera according to an embodiment of the present invention.

Embodiments of the present invention are described below referring to the drawings. The following descriptions include specific and detailed contents for exemplifications. However, a skilled person in the art will understand that embodiments where various modifications are made to the detailed contents as described below are within the scope of the present invention. Therefore, the exemplary embodiments of the present invention are described below without loss of generality for the claimed inventions and without limiting the claimed inventions at all.

FIG. 1 is a block diagram illustrating an outline of a configuration of a digital camera (for example, a single lens reflex digital camera) according to one aspect of the present embodiment. Regarding each of components described herein, a hardware can be implemented in an element such as a CPU or a memory of a computer, on the other hand, a software can be implemented in a computer program, etc. However, each of the components is described herein as a functional block which is implemented in the combination thereof. Therefore, a skilled person in the art can understand that these functional blocks are implemented in a combination of the hardware and software in various forms.

The digital camera 1 illustrated in FIG. 1 is configured by a lens unit 2, an image sensor 3, a light emitting device 4, a memory 5, a recording device 6, a display device 7, an image signal processing circuit 8, a lens control device 9, an image sensor control device 10, a light emitting control device 11, and a camera control device 12.

The lens unit 2 is driven and controlled by the lens control device 9 with regard to a zoom function, a focus function, a diaphragm function, or the like, and the lens unit 2 forms an image of a subject in the imago sensor 3.

The image sensor 3 is a MOS-type solid-state image device which is driven and controlled by the image sensor control device 10, and converts incident subject lights on the image sensor 3 via the lens unit 2 into image signals (S). Hereinafter, the image sensor is referred to as the MOS-type solid-state image device. Detailed descriptions with regard to this image sensor 3 are discussed below.

The light emitting device 4 is a device such as an electronic flash, a flash, or the like which is driven and controlled by the light emitting control device 11, and controls the lights reflected from the subject by shedding lights emitted from the light emitting device 4 on the subject.

The image signal processing circuit 8 executes processing such as an amplification of signals, a conversion into image data and various corrections, compression of the image data, or the like for the image signals outputted from the image sensor 3. The image signal processing circuit 8 utilizes the memory 5 as a temporary memory means of the image data (D) in the each of the processing.

The recording device 6 is a detachable recording media such as a semiconductor memory, and records or read the image data (D).

The display device 7 is a display device such as a liquid crystal device which displays images in accordance with the image data (D) formed in the image. sensor 3, and processed by the image signal processing circuit 8 or the image data (D) read from the recording device 6.

The camera control device 12 is a control device which controls whole of the digital camera 1. Furthermore, the camera control device 12 executes a cooperation control of the image sensor 3 and the light emitting device 4 by controlling the image sensor control device 10 and the light emitting control device 11.

<First Embodiment>

Figure 2:
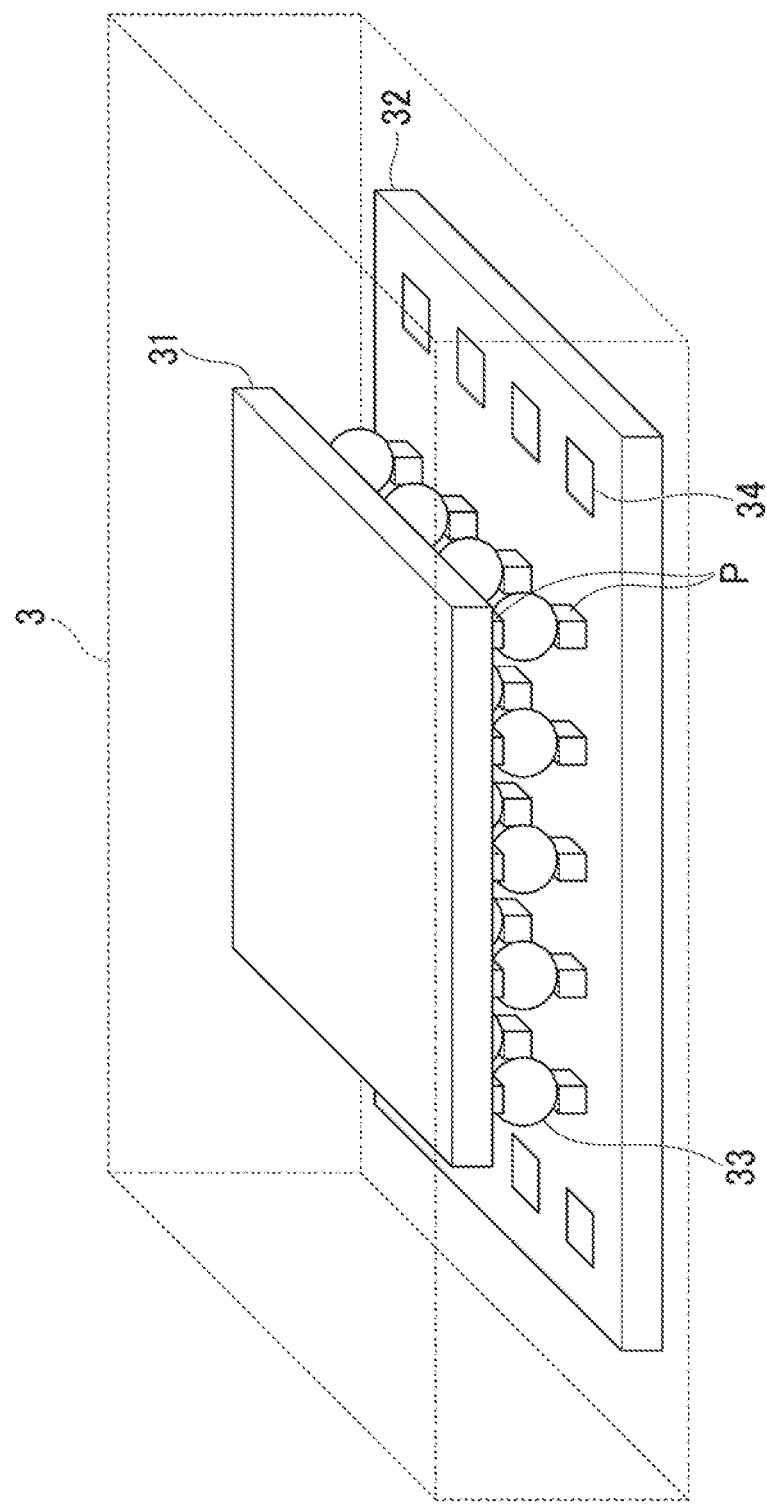
FIG. 2 is a schematic view illustrating an outline of a configuration of an image sensor according to a first embodiment of the present invention.

Next, the image sensor 3 of a first embodiment which is mounted in the digital camera 1 of the present embodiment s described. FIG. 2 is a schematic view illustrating an outline of a configuration of the image sensor 3 according to the first embodiment. In FIG. 2, the image sensor 3 is configured by pixel chip 31, a pixel signal processing chip 32, chip connection units 33, external wiring connection units 34, and pads P.

The pixel chip 31 is a chip which includes pixels, which include photoelectric conversion elements described below and are arranged in two dimensions, and converts incident subject lights into electrical signals. The pixel chip 31 is driven and controlled by the signals in the pixel chip 31 or the signals sent from the pixel signal processing chip 32. Furthermore, the pixel chip 31 transmits the converted electrical signals to the pixel signal processing chip 32.

The pixel signal processing chip 32 is a chip which executes processing such as a temporary memory (retention) or an integration of the electrical signals transmitted from the pixel chip 31, and an easy arithmetic of the electrical signals. Furthermore, the pixel signal processing chip 32 transmits signals for driving and controlling the pixel chip 31 to the pixel chip 31.

The chip connection units 33 are connection units which electrically connect the pixel chip 31 and the pixel signal processing chip 32. A bump, etc. made by, for example, an evaporation method or a plating method, is used for the chip connection units 33. Furthermore, the space between the pixel chip 31 and the pixel signal processing chip 32 may be filled with an insulating member such as an adhesive. The pixel 31 and the pixel signal processing chip 32 transmit and receive the signals via the chip connection units 33. The pixel chip 31 and the chip connection units 33 are connected each other via the pad P. Furthermore, the pixel signal processing chip 32 and the chip connection units 33 are connected each other via, the pad P.

The external wiring connection units 34 are connection units which electrically connect the image sensor 3 and other blocks. The input-output signals are transmitted to and received from other components (blocks) in the digital camera 1 via the external wiring connection wits 34. For example, a constitution that a package (not shown) for protecting the image sensor 3 and the external wiring connection units 34 are connected each other via a wire and the input-output signals of the image sensor 3 are transmitted to and received from the outside of the package is assumed.

Figure 3:
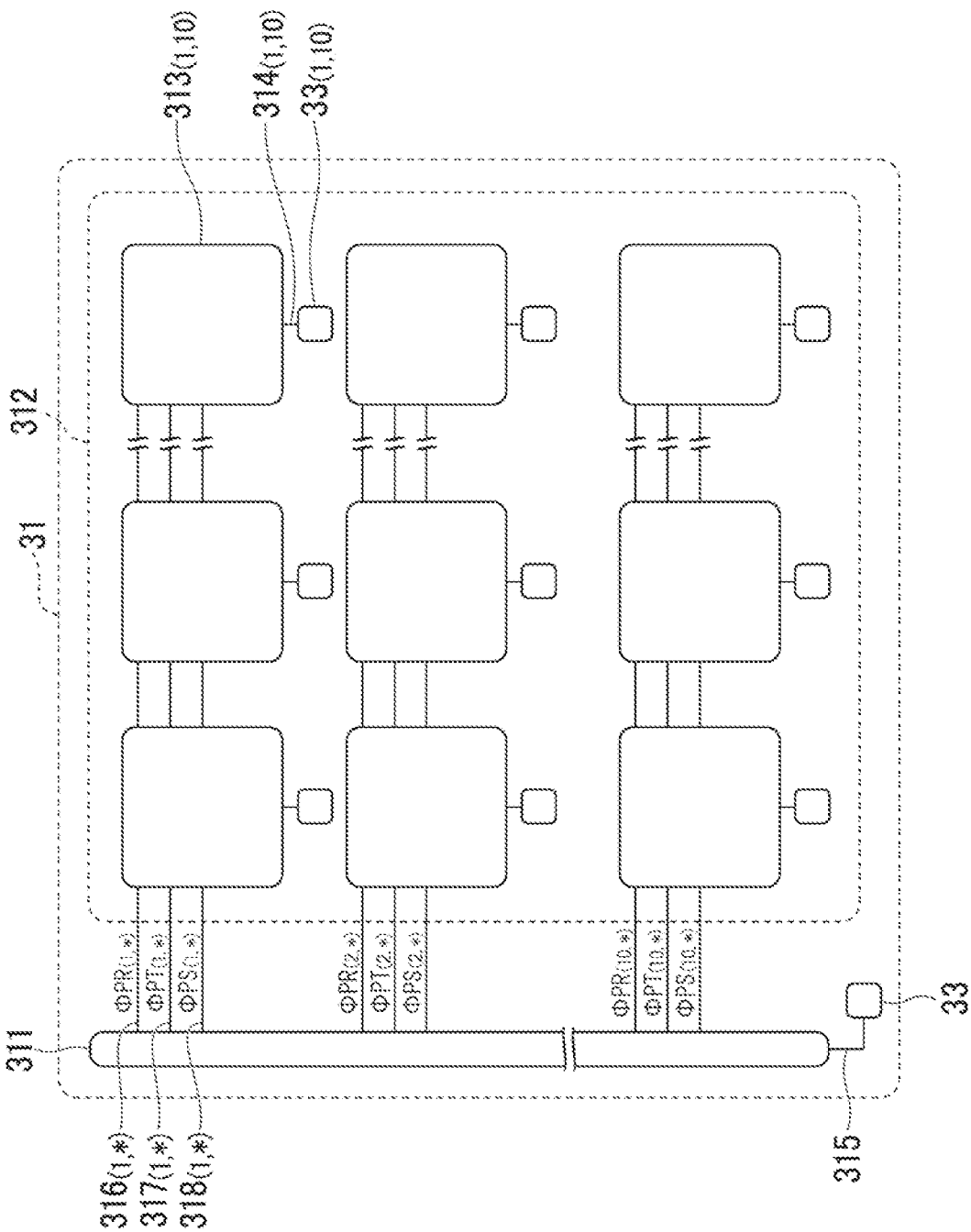
FIG. 3 is a circuit diagram illustrating an outline of a configuration of pixel chips in the image sensor according to the first embodiment.

Next, the pixel chip 31 of the first embodiment is described. FIG. 3 is a circuit diagram illustrating an outline of a configuration of the pixel chips 31 in the image sensor 3 according to the first embodiment. In FIG. 3, the pixel chip 31 is configured by a pixel chip vertical scanning circuit 311, a pixel array unit 312, unit pixels 313, pixel signal lines 314, a pixel chip vertical scanning circuit signal line 315, a pixel reset line 316, a pixel transferring line 317, and a pixel selection line 318. In the pixel chip illustrated in FIG. 3, the example of the pixel array unit 312 where a plurality of the unit pixels 313 is two-dimensionally arrayed in 10 rows by 10 columns is illustrated. In the constitution of this pixel chip 31, operations of a reading timing described below are performed.

In the pixel chip 31 illustrated in FIG. 3, a numeral and a symbol within the "( ):parentheses" indicated after each slim indicate a row number and a column number corresponding to the unit pixel 313 arranged in the pixel chip 31. Furthermore, the first numeral in the "( )parentheses" indicates the row number, and the final numeral indicates the column number. For example, the unit pixel 313 in the second row and the third column is denoted by the unit pixel 313 (2,3). Furthermore, when only either the row number or the column number, in other word, the same row number or column number is indicated, the same row number or column number denoted by a numeral, and the row number or column number which is not the same is denoted by "*:asterisk". For example, the pixel reset line 316 in the third row is denoted by the pixel reset line 316 (3, *). Moreover, when both the number and the column number are not specified, the "( ):parentheses" after each sing is not denoted.

The pixel chip vertical scanning circuit 311 controls each of the unit pixels 313 in the pixel array unit 312, and outputs the pixel signals of each of the unit pixels 313 to the pixel signal lines 314. The pixel chip vertical scanning circuit 311 outputs control signals for controlling the unit pixels 313 to the control signal lines (the pixel reset line 316, the pixel transfer line 317, and the pixel selection line 318) for each of the rows of the unit pixels 313 arranged in the pixel array unit 312.

Each of the unit pixels 313 in the pixel array unit 312 outputs electrical signals in accordance with the reset signals when the unit pixels 313 are reset and the amount of light received of the incident subject light to the pixel signal lines 314 as pixel signals.

The pixel signal lines 314 and the pixel chip vertical scanning circuit signal line 315 are connected to the pixel signal processing chip 32 via the chip connection unit 33. The various necessary signals for driving and controlling the pixel chip 31, and the pixel signals which each of the unit pixels 313 in the pixel chip 31 outputs are transmitted and received between the pixel chip 31 and the pixel signal processing chip 32 via the pixel signal lines 314 and the pixel chip vertical scanning circuit signal line 315.

Figure 4:
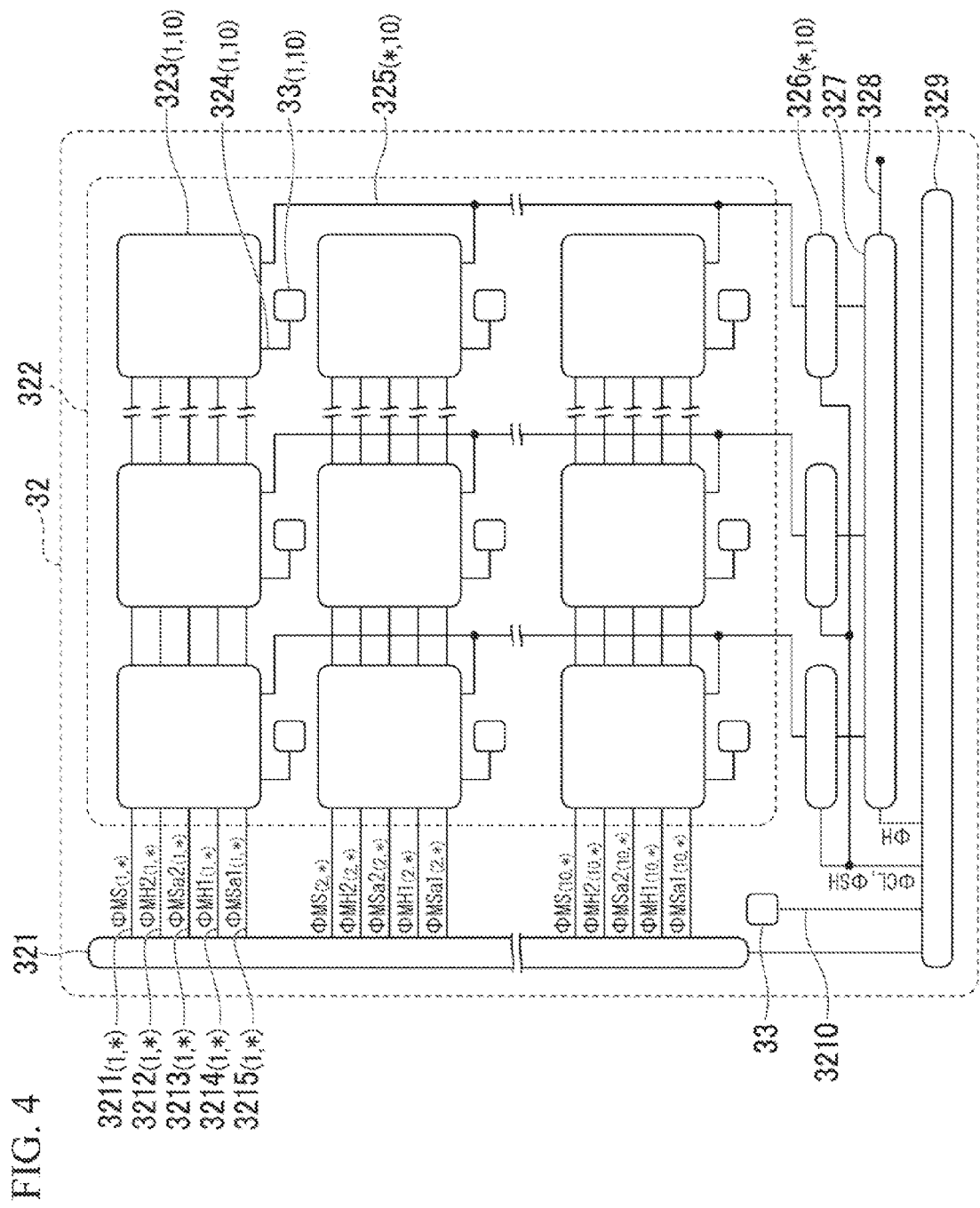
FIG. 4 is a circuit diagram illustrating an outline of a configuration of a pixel signal processing chip included in the image sensor according to the first embodiment.

Next, the pixel signal processing chip 32 of the first embodiment is described. FIG. 4 is a circuit diagram illustrating an outline of a configuration of pixel signal processing chip 32 in the image sensor 3 according to the first embodiment. In FIG. 4, the pixel signal processing chip 32 is configured by a pixel signal processing chip vertical scanning circuit 321, a memory array unit 322, unit memories 323, memory signal lines 324, pixel signal processing chip vertical signal lines 325, pixel signal processing chip column processing circuits 326, a pixel signal processing chip horizontal scanning circuit 327, a pixel signal processing chip horizontal scanning circuit signal line 328, an image sensor control circuit 329, an image sensor control circuit signal line 3210, memory selection lines 3211, second memory hold lines 3212, second mentors sampling lines 3213, first memory hold lines 3214, and first memory sampling lines 3215. In the pixel signal processing chip 32 illustrated in FIG. 4, the example of the memory array unit 322 where a plurality of the unit memories 323 is two-dimensionally arranged in 10 rows by 10 columns is illustrated. Operations of reading timing described below are performed using the configuration of this pixel signal processing chip 32.

In the pixel signal processing chip 32 illustrated in FIG. 4, the numeral and the symbol within the "( ):parentheses" indicated after each sign indicate the row number and the column number corresponding to the unit memory 323 arranged in the pixel signal processing chip 32, and the way of indication is similar to that of the pixel chip 31 illustrated in FIG. 3.

The pixel signal processing chip vertical scanning circuit 321 controls each of the unit memories 323 in the memory array unit 322, and outputs the memory signals of each of the unit memories 323 to the pixel signal processing chip vertical signal lines 325. The pixel signal processing chip vertical scanning circuit 321 outputs control signals for controlling the unit memories 323 to the control signal lines (the memory selection lines 3211, the second memory hold lines 3212, the second memory sampling lines 3213, the first memory hold lines 3214, and the first memory sampling lines 3215) for each of the rows of the unit memories 323 arranged in the memory array unit 322.

The pixel signals which are transmitted from each of the unit pixels 313 in the pixel array unit 312 included in the pixel chip 31 to the memory signal lines 324 via the chip connection units 33, are input into each of the unit memories 323 in the memory array unit 322. Furthermore, each of the unit memories 323 supplies the electrical signals in accordance with the pixel signals input to the pixel signal processing chip vertical signal lines 325 as memory signals.

The pixel signal processing chip column processing circuits 326 process the memory signals transmitted from the unit memories 323. In the processing for the memory signals by the pixel signal processing chip column processing circuits 326, a subtraction of the signals (differential processing) is executed based on a clamp pulse Φ CL and a sample hold pulse ΦSH which are input from the image sensor control circuit 329. Furthermore, a processing such as an amplification and a comparison of signals are included in the processing by the pixel signal processing chip column processing circuits 326. Furthermore, the pixel signal processing chip column processing circuits 326 include an electrical current source load connected to the pixel signal processing chip vertical signal lines 325.

The pixel signal processing chip horizontal scanning circuit 327 reads sequentially the processed signals output from the pixel signal processing chip column processing circuits 326 based on a horizontal scanning pulse Φ H input from the image sensor control circuit 329.

The image sensor control circuit 329 controls the pixel signal processing chip vertical scanning circuit 321, the pixel signal processing chip column processing circuits 326, the pixel signal processing chip horizontal scanning circuit 327, and the pixel chip vertical scanning circuit 311 in the pixel chip 31.

The memory signal lines 324 and the image sensor control circuit signal line 3210 are connected to the pixel chip 31 via the chip connection unit 33. The various necessary signals for driving and controlling the pixel chip 31, and the pixel signals which each of the unit pixels 313 in the pixel chip 31 outputs are transmitted and received between the pixel chip 31 and the pixel signal processing chip 32 via the memory signal lines 324 and the image sensor control circuit signal line 3210.

By the controls with the image sensor control circuit 329, the pixel signal processing chip vertical scanning circuit 321, the pixel signal processing, chip column processing circuits 326, the pixel signal processing chip horizontal scanning circuit 327, and the pixel chip vertical scanning circuit 311, the image sensor 3 outputs the image signals of the incident subject lights.

Figure 5:
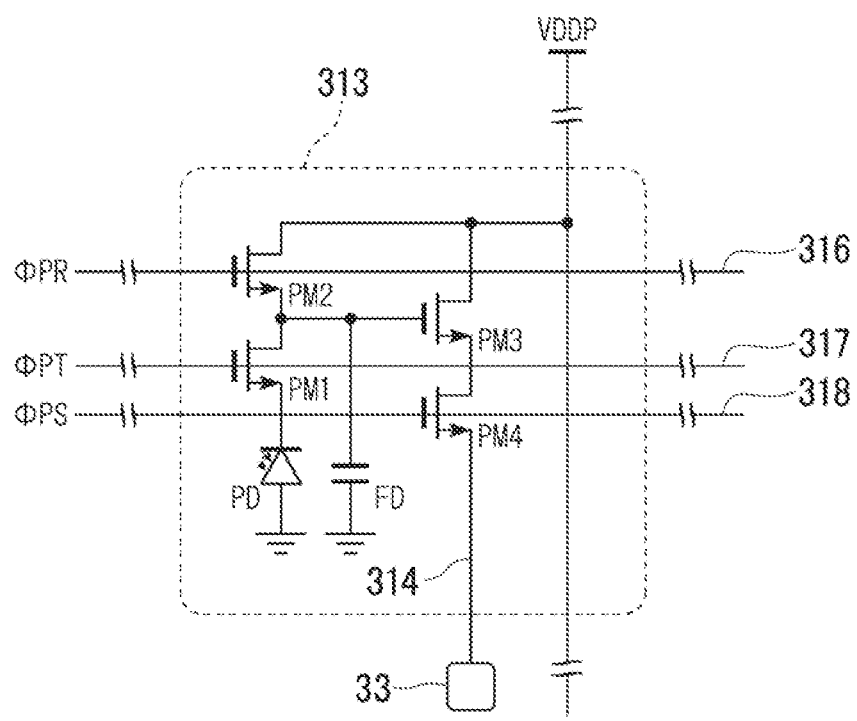
FIG. 5 is a circuit diagram illustrating an outline of a configuration of unit pixels in the pixel chip included in the image sensor according to the first embodiment.

Next, the unit pixels 313 included in the pixel chip 31 in the image sensor 3 of the first embodiment are described. FIG. 5 is a circuit diagram illustrating an outline of a configuration of the unit pixels 313 in the pixel chip 31 included in the image sensor 3 according to the first embodiment. The unit pixel 313 is a circuit which converts the incident lights into the electrical signals, and output these electrical signals to the pixel signal line 314. Each of the unit, pixels 313 is configured by a photodiode PD, a pixel charge accumulation unit FD, a pixel transfer transistor PM1, a pixel reset transistor PM2, a pixel amplifying transistor PM3, and a pixel selection transistor PM4.

The pixel charge accumulation unit FD is a capacitor which pertains to a node connected to a gate terminal of the pixel amplifying transistor PM3, and is illustrated by a symbol of capacitor in the outline of the configuration of the unit pixel 313 illustrated in FIG. 5. The outline of the configuration of the unit pixel 313 illustrated in FIG. 5 is a similar configuration to a unit pixel of a conventional image sensor.

The photodiode PD is a photoelectric conversion unit (a photoelectric conversion element) which photoelectrically converts the incident lights, and generates the signal charges.

The pixel charge accumulation unit FD is a capacitor which accumulates the signal charges.

The pixel transfer transistor PM1 transfers the signal charges generated by the photodiode PD to the pixel charge accumulation unit FD connected to the gate terminal of the pixel amplifying transistor PM3 based on a pixel transmitting pulse Φ PT input from the pixel chip vertical scanning circuit 311. The signal charges transferred by the pixel transfer transistor PM1 are accumulated in the pixel charge accumulation unit FD.

The pixel amplifying, transistor PM3 outputs voltage in accordance with the signal charges accumulated in the pixel charge accumulation unit FD.

The pixel reset transistor PM2 resets the pixel charge accumulation unit FD to a power supply potential VDDP based on a pixel reset pulse Φ PR input from the pixel chip vertical scanning circuit 311.

The pixel selection transistor PM4 outputs the voltage output from the pixel amplifying, transistor PM3 to the pixel signal line 314 as pixel signals output from the unit pixel 313 based on a pixel selection pulse Φ PS input from the pixel chip vertical scanning circuit 311.

The pixel signal line 314 is connected to the chip connection unit 33.

Figure 6:
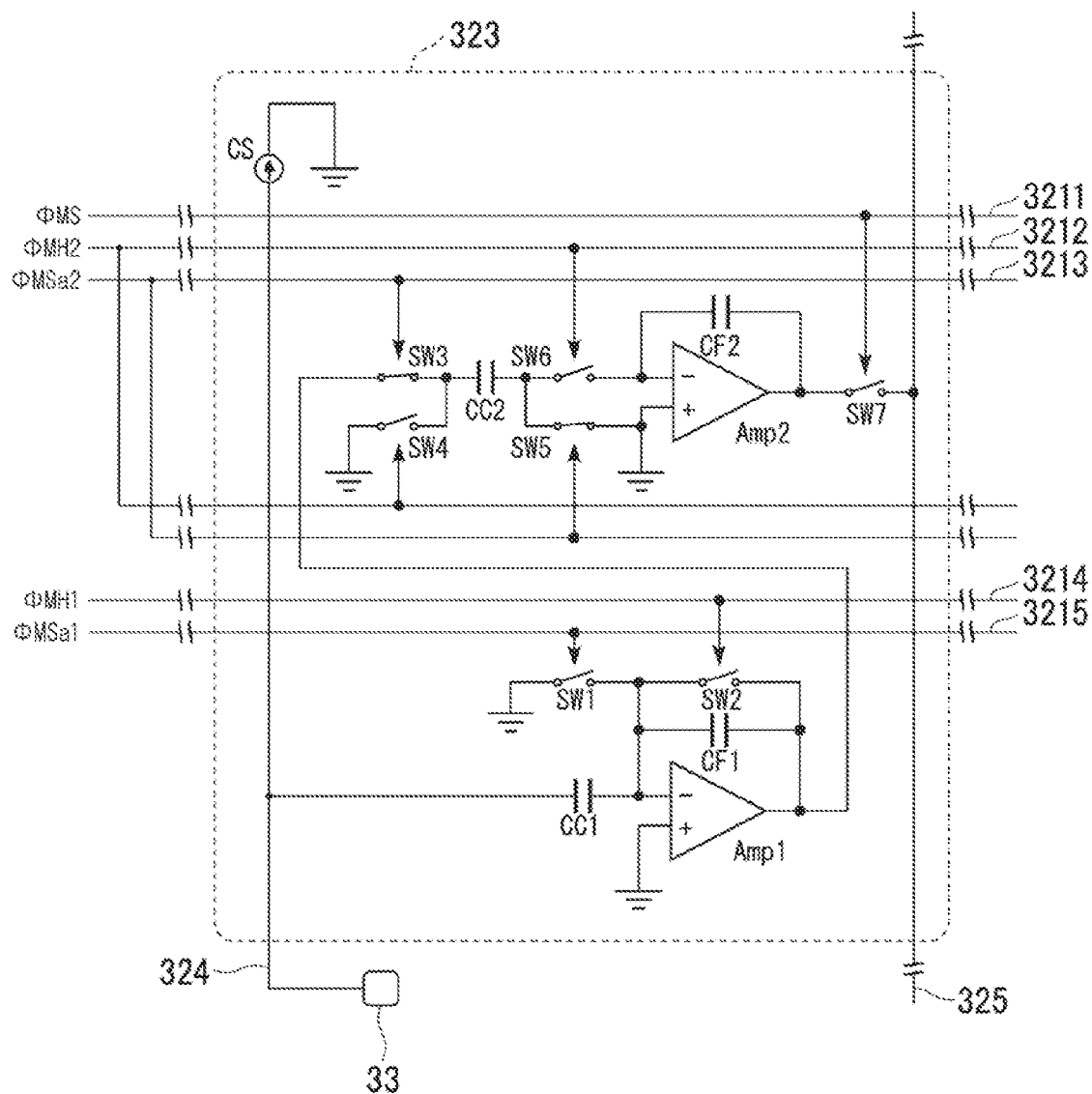
FIG. 6 is a circuit diagram illustrating an outline of a configuration of a unit memory in the pixel signal processing chip included in the image sensor according to the first embodiment.

Next, the unit memories 323 included in the pixel signal processing chip 32 in the image sensor 3 or the first embodiment are described. FIG. 6 is a circuit diagram illustrating an outline of a configuration of a unit memory 323 in the pixel signal processing chip 32 included in the image sensor 3 according to the first embodiment. The unit memory 323 is a circuit which retains the signals input from the memory signal line 324, and further integrates and outputs the signals to the pixel signal processing chip vertical signal lines 325. Each of the unit memories 323 is configured by a first memory coupling capacitor CC1, a first memory charge accumulation unit CF1, a first signal amplifying circuit Amp1, a second memory coupling capacitor CC2, a second memory charge accumulation unit CF2, a second signal amplifying circuit Amp2, a first switch SW1, a second switch SW2, a third switch SW3, a fourth switch SW4, a fifth switch SW5, a sixth switch SW6, a memory selection switch SW7, and a memory current load CS.

The first memory charge accumulation unit CF1 is a capacitor, wherein one end of the first memory charge accumulation unit CF1 is connected to the output of the first amplifying circuit Amp1 and the other end is connected to the negative input side of the first amplifying circuit Amp1, and is illustrated by a symbol of capacitor in the outline of the configuration of the unit memory 323 illustrated in FIG. 6.

The first memory coupling capacitor CC1 is a capacitor, wherein one end of the first memory coupling capacitor CC1 is connected to the memory signal line 324 and the other end is connected to the negative input of the first amplifying circuit Amp1.

The first amplifying circuit Amp1 is an amplifying circuit, wherein the output of the first amplifying circuit Amp1 is connected to the third switch SW3, the positive input is connected to a ground, and the negative input is connected to the first memory coupling capacitor CC1.

The first switch SW1 is a switch, wherein one end of the first switch SW1 is connected to a ground, and the other end is connected to the first memory coupling capacitor CC1.

The second switch SW2 is a switch, wherein one end of the second switch SW2 is connected to the negative input of the first amplifying circuit Amp1, and the other end is connected to the output of the first amplifying circuit Amp1.

In the unit memory 323, a correlated double sampling (CDS) circuit is configured by the first memory charge accumulation unit CF1, the first memory coupling capacitor CC1, the first amplifying circuit Amp1, the first switch SW1, and the second switch SW2.

The second memory charge accumulation unit CF2 is a capacitor, wherein one end of the second memory charge accumulation unit CF2 is connected to the output of the second amplifying circuit Amp2 and the other end is connected to the negative input side of the second amplifying circuit Amp2, and is illustrated by a symbol of capacitor in the outline of the configuration of the unit memory 323 illustrated in FIG. 6.

The second memory coupling, capacitor CC2 is a capacitor, wherein one end of the second memory coupling capacitor CC2 is connected to the third switch SW3 and the other end is connected to the fifth switch SW5.

The second amplifying circuit Amp2 is an amplifying circuit, wherein the output of the second amplifying circuit Amp2 is connected to the memory selection switch SW7, the positive input is connected to a ground, and the negative input is connected to the sixth switch SW6.

The third switch SW3 is a switch, wherein one end of the third switch SW3 is connected to the output of the first amplifying circuit Amp1, and the other end is connected to the second memory coupling capacitor CC2.

The fourth switch SW4 is a switch, wherein one end of the fourth switch SW4 is connected to the second memory coupling capacitor CC2, and the other end is connected to a ground.

The fifth switch SW5 is a switch wherein one end of the fifth switch SW5 is connected to the second memory coupling capacitor CC2, and the other end is connected to a ground.

The sixth switch SW6 is a switch, wherein one end of the sixth switch SW6 is connected to the second memory coupling capacitor CC2, and the other end is connected to the negative input of the second amplifying circuit Amp2.

In the unit memory 323, an integration circuit is configured by the second memory charge accumulation unit CF2, the second memory coupling capacitor CC2, the second amplifying circuit Amp2, the third switch SW3, the fourth switch SW4, the fifth switch SW5, and the sixth switch SW6.

The memory selection switch SW7 is a switch, wherein one end of the memory selection switch SW7 is connected to the output of the second amplifying circuit Amp2, and the other end is connected to the pixel signal processing chip vertical signal lines 325.

The memory current load CS is a current source, wherein one end of the memory current load CS is connected to the memory signal line 324, and the other end is connected to a ground of the pixel signal processing chip 32. The memory current load CS drives the signal line connected to the chip connection unit 33 at a constant current. The memory signal line 324 is connected to the chip connection unit 33. Furthermore, the memory current load CS may have, a configuration, wherein one end of the memory current load CS is connected to the pixel signal line 314 of the pixel chip 31, and the other end is connected to a ground of the pixel chip 1.

Hereinafter, the operations of the unit memory 323 are described. In the CDS circuit, the first switch SW1 is controlled so that the first switch SW1 has a conductive condition when a first memory sampling pulse Φ MSa1 input from the pixel signal processing chip vertical scanning circuit 321 is "High". Furthermore, the second switch SW2 is controlled so that the second switch SW2 has a conductive condition when a first memory hold pulse Φ MH1 input from the pixel signal processing chip vertical scanning circuit 321 is "High".

In the operations of the CDS circuit, the pixel signal processing chip vertical scanning circuit 321 sets the first memory sampling pulse Φ MSa1 to "High" and starts a sampling operation when the pixel signals which are output from the unit pixel 313 and are transmitted to the memory signal line 324 via the chip connection unit 33 are on a reset level. Then, the pixel signal processing chip vertical scanning circuit 321 sets the first memory hold pulse Φ MH1 to "High" and starts a hold operation when the pixel signals transmitted to the memory signal line 324 is on a signal level. This results in the voltage of the difference between the reset level and the signal level of the pixel signal output from the unit pixel 313 being output from the first amplifying circuit Amp1, in other words, the CDS circuit.

Furthermore, in the integration circuit, the third switch SW3 and the fifth switch SW5 are controlled so that the third switch SW3 and the fifth switch SW5 have a conductive condition when a second memory sampling pulse Φ MSa2 input from the pixel signal processing chip vertical scanning circuit 321 is "High". Furthermore, the fourth switch SW4 and the sixth switch SW6 are controlled so that the fourth switch SW4 and the sixth switch SW6 have a conductive condition when a second memory hold pulse Φ MH2 input from the pixel signal processing chip vertical scanning circuit 321 is "High".

In the operations of the integration circuit, the pixel signal processing chip vertical scanning circuit 321 sets the second memory sampling pulse Φ MSa2 to "High" and starts to sampling operation when the pixel signals transmitted to the memory signal line 324 are on a reset level. Then, the pixel signal processing chip vertical scanning circuit 321 sets the second memory hold pulse Φ MH2 to "High" and starts a hold operation when the pixel signals transmitted to the memory signal line 324 is on a signal level. This results in the voltage of the difference between the reset level and the signal level of the pixel signal output from the CDS circuit being integrated in the second memory charge accumulation unit CF2 when the second memory hold pulse Φ MH2 is set to "High".

Thus, by executing alternatively the sampling operation and the hold operation the CDS circuit, and the integration operation the sampling operation and the hold operation) by the integration circuit, the pixel signal processing chip vertical scanning circuit 321 makes the integration circuit integrate the voltage of the level difference at the time that the second memory hold pulse Φ MH2 is "High".

Furthermore, in the unit memory 323, the memory selection switch SW7 are controlled so that the memory selection switch SW7 has a conductive condition when a memory selection pulse Φ MS input from the pixel signal processing chip vertical scanning circuit 321 is "High".

After any number of the integrations by the integration circuit are finished, the pixel signal processing chip vertical scanning circuit 321 sets the memory selection pulse Φ MS to "High", and outputs the voltage of the level difference integrated by the integration circuit to the pixel signal processing chip vertical signal lines 325. Thus, the pixel signal processing chip vertical scanning circuit 321 transmits the memory signals output from the unit memory 323 to the pixel signal processing chip column processing circuits 326.

As described above, in the image sensor 3 of the first embodiment, the photodiode PD included in each of the unit pixels 313 in the pixel chip 31 outputs the pixel signals based on the signal charges generated in response to the incident subject lights to the pixel signal processing chip 32 via the chip connection unit 33. Furthermore, the pixel signal processing chip 32 further executes a processing such as the differential processing for the memory signals produced by temporarily memorizing (retaining) and integrating the pixel signals input from the pixel chip 31, and sequentially outputs the memory signals.

As illustrated in FIG. 2 to FIG. 4, in the image sensor 3, each of the unit pixels 313 in the pixel array unit 312 and the each oldie unit memories 323 in the memory array unit 322 are connected each other via each corresponding chip connection unit 33. In other words, the image sensor 3 has the configuration which includes the chip connection unit 33 per one of the pixels. However, the configuration of the image sensor 3 is not limited to the configuration of the image sensor 3 illustrated in FIG. 2 to FIG. 4, a configuration which includes the chip connection unit 3 per predefined numbers or the pixels is also possible.

Figure 7:
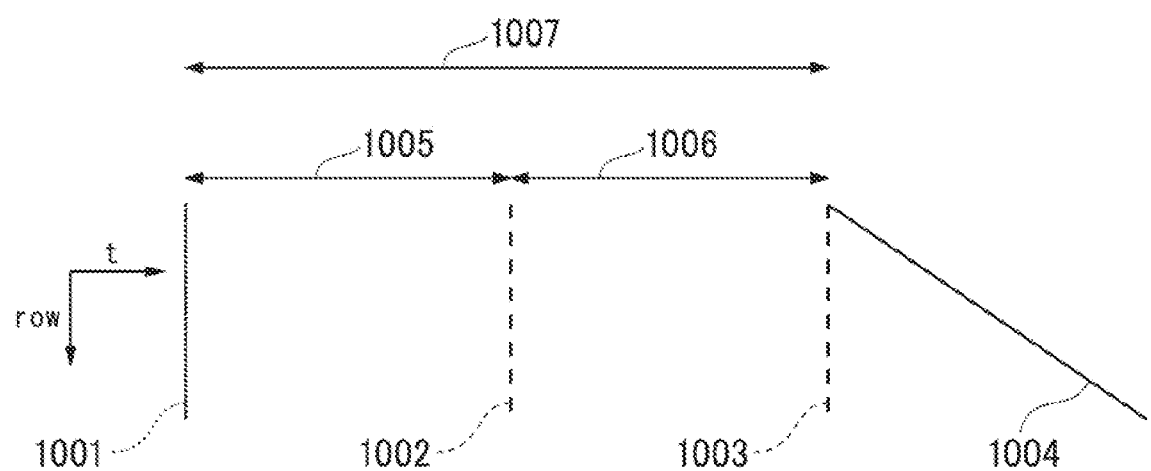
FIG. 7 is a sequence diagram illustrating an outline of an operation sequence performing a long-time exposure in the image sensor according to the first embodiment.

Next, the operation sequence of the image sensor 3 of the first embodiment is described. FIG. 7 is a sequence diagram illustrating an outline of an operation sequence performing a long-time exposure in the image sensor 3 according to the first embodiment. In the operation sequence of the long-time exposure illustrated in FIG. 7, an example is illustrated, wherein the long-time exposure is divided into two long-time exposures, and the two long-time exposures are executed.

In FIG. 7, the horizontal axis t indicates a time, and the vertical axis row indicates the row of the image sensor 3. Furthermore, a sequence 1001 indicates a simultaneous reset operation of all of the pixels, sequences 1002 and 1003 indicate a simultaneous transfer operation of all of the pixels, and a sequence 1004 indicates a read operation of all of the pixels. Furthermore, a first divided exposure term 1005 indicates a first exposure term from the simultaneous reset operation of all of the pixels to the simultaneous transfer operation of all of the pixels, and as second divided exposure term 1006 indicates a second exposure term from the simultaneous transfer operation of all of the pixels to the simultaneous transfer operation of all of the pixels. In the operation sequence of the long-time exposure illustrated in FIG. 7, the exposure term combining the first divided exposure term 1005 and the second divided, exposure term 1006 is a total exposure term 1007 in the long-time exposure. The total exposure term 1007 is an accumulation time (an exposure time) which results in pixel defects caused by dark current if the photodiode PD generates the signal charges at one time, while each of the first divided exposure term 1005 and the second divided exposure term 1006 is an accumulation time which does not result in pixel defects caused by dark current.

In the operation sequence of the long-time exposure of the image sensor 3. firstly, the simultaneous reset operation of all of the pixels illustrated by the sequence 1001 is executed In the simultaneous reset operation of all of the pixels of the sequence 1001, the signal charges accumulated in the charge accumulation unit FD and the photodiode PD in all of the unit pixels 313 included in the pixel chip 31 are simultaneously discharged (reset) in the pixel chip 31. More specifically, the pixel chip vertical scanning circuit 311 sets the pixel transfer transistor PMI and the pixel reset transistor PM2 of the unit pixel 313 "ON" state by setting the pixel reset pulse Φ PR and the pixel transfer pulse Φ PT to "High" level. This results in the charge accumulation unit FD and the photodiode PD in unit pixel 313 being reset. Then, the pixel chip vertical scanning circuit 311 sets the pixel transfer transistor PM1 and the pixel reset transistor PM2 of the unit pixel 313 "OFF" state by setting the pixel reset pulse Φ PR and the pixel transfer pulse Φ PT to "Low", and finishes the reset of the charge accumulation unit FD and the photodiode PD.

Furthermore, in the simultaneous reset operation of all of the pixels of the sequence 1001, in the pixel signal processing chip 32, the charges accumulated in the second memory charge accumulation unit CF2 and the second memory coupling capacitor CC2 in all of the unit memories 323 included in the pixel signal processing chip 32 are simultaneously discharged (rest). More specifically, the pixel signal processing chip vertical scanning circuit 321 sets the third switch SW3 and the fifth switch SW5 of the unit memory 323 to the conductive condition by setting the second memory sampling pulse Φ MSa2 to "High". Furthermore, the fourth switch SW4 and the sixth switch SW6 of the unit memory 323 are set to the conductive condition by setting the second memory hold pulse Φ MH2 to "High". Furthermore, the seventh switch SW7 is set to the conductive condition by setting the memory selection pulse Φ MS to "High". The pixel signal processing chip vertical signal lines 325 is previously connected to a ground by the pixel signal processing chip column processing circuits 326. This results in the second mentor y charge accumulation unit CF2 and the second memory coupling capacitor CC2 in the unit memory 323 being reset. Furthermore, the first switch SW1 and the second switch SW2 of the unit memory 323 are set to the conductive condition by setting the first memory sampling pulse Φ MSa1 and the first memory hold pulse Φ MH1 to This results in the first memory charge accumulation unit CF1 and the first memory coupling capacitor CC1 in the unit memory 323 being reset.

Next, the simultaneous Minster operation of all of the pixels indicated by the sequence 1002 is executed when the predefined first divided exposure term 1005 is passed. In the simultaneous transfer operation of all of the pixels of sequence 1002, the pixel signals output from each of the unit pixels 313 are transmitted to the unit memory 323 by simultaneously transferring the signal charges generated from the photodiode PD in each of the unit pixels 313 to each of the pixel charge accumulation unit FD in the pixel chip 31. More specifically, the pixel chip vertical scanning circuit 311 sets the pixel transfer transistor PM1 of the unit pixel 313 to "ON" state by setting the pixel transfer pulse Φ PT to "High" level. This results in the signal charges generated from the photodiode PD in the unit pixel 313 being transferred to the pixel charge accumulation unit FD and being, retained. The pixel chip vertical scanning circuit 311 sets the pixel transfer transistor PM1 of the unit pixel 313 to "OFF" state by setting the pixel transfer pulse Φ PT to "Low" level. This results in the photodiode PD being restarted and producing the signal charges. Furthermore, the pixel chip vertical scanning circuit 311 sets the pixel selection pulse Φ PS to "High" level. Thus, the voltage corresponds to the signal charges accumulated in the pixel charge accumulation unit FD and are outputs from the pixel amplifying transistor PM3, and the voltage is supplied to the pixel signal line 314 and transmitted to the memory signal line 324 of the unit memory 323 via the chip connection unit 33.

In the simultaneous transfer operation of all of the pixels indicated by the sequence 1002, in the pixel signal processing chip 32, the CDS circuit in each of the unit memories 323 executes the CDS processing for each of the pixel signals transferred from each of the unit pixels 313, the CDS processed voltage is retained in the second memory charge accumulation unit CF2 of the integration circuit in each of the unit memories 323.

Next, the simultaneous transfer operation of all of the pixels indicated by the sequence 1003 is executed when the predefined second divided exposure term 1006 is passed. In the simultaneous transfer operation of all of the pixels of sequence 1003, in a similar way to the simultaneous transfer operation of all of the pixels of sequence 1002, in the pixel chip 31, the signal charges generated from the photodiode PD in each of the unit pixels 313 are simultaneously transferred to each of the pixel charge accumulation unit FD, and the pixel signals output front each of the unit pixels 313 are transmitted to the unit memories 323. Then, in the pixel signal processing chip 32, the voltage generated by the CDS processing of each of the pixel signals transferred front each of the unit pixels 313 is integrated in the voltage previously retained in the second memory charge accumulation unit CF2 in the sequence 1002, and the integrated voltage is retained in the second memory charge accumulation un it CF2 in each of the unit memories 323.

Thus, in the operation sequence of the long-time exposure, in each of the first divided exposure term 1005 and the second divided exposure term 1006, the outputs by the signal charges generated by the photodiode PD included in the unit pixel 313 are sequentially transmitted to the unit memory 323 via the chip connection unit 33. Then, by sequentially integrating the signals transmitted from the unit pixel 313 in the corresponding integration circuit included in the unit memory 323, the memory signals in accordance with the signal charges generated from the photodiode PD in the each of the unit pixels 313 are retained in the unit memory 323 in the total exposure term 1007 combining the first divided exposure term 1005 and the second divided exposure term 1006.

Then, the read operation of all of the pixels indicated by the sequence 1004 is executed. In the read operation of all of the pixels of the sequence 1004, in the pixel signal processing chip 32, the memory signals integrated by each of the unit memories 323 in sequence 1002 and the sequence 1003 are sequentially supplied to the pixel signal processing chip vertical signal lines 325. This results in the memory signals in accordance with the signal charges generated from the photodiode PD in each of the unit pixels 313 in the total exposure term 1007 being sequentially transmitted to the pixel signal processing chip column processing circuits 326. Furthermore, in the pixel signal processing chip 32, the signals generated by sequentially executing the differential processing for each of the memory signals transmitted from the unit memories 323 by the pixel signal processing chip column processing circuits 326, are sequentially output as the image signals output from the image sensor 3.

As described above, in the image sensor 3 of the first embodiment, the supply of the amount of light of the photodiode in the long-time exposure is divided into a number of exposure terms (two times of the first divided exposure term 1005 and the second divided exposure term 1006 in the first embodiment) which result in no pixel defects being caused by dark current, and the divided supplies are executed. Then, the pixel signals achieved in each of the exposure terms are integrated, the integrated signals are the final pixel signals (memory signals). This makes it possible for, in the image sensor 3 of the first embodiment, the influence of the pixel defects caused by dark current to be decreased. In other words, in the image sensor 3 of the first embodiment, by previously setting one exposure term to an accumulation time (an exposure time) which results in no pixel defects being caused by dark current, and dividing the total exposure term in the long-time exposure into the setup accumulation times, the occurrence of the major defects generated by the influence of the pixel defects caused by dark currents on the peripheral parts can be suppressed.

Regarding the division of the total exposure term in the long-time exposure, for example, a way that the image sensor control circuit 329 divides the total exposure term into predefined exposure terms is anticipated. Furthermore, for example, a way that the image sensor control device 10 of the digital camera 1 divides the total exposure term, and a way that the image sensor control device 10 is controlled so that the camera control device 12 divides the exposure term are also anticipated. Furthermore, the predefined exposure term can also he varied based on the temperature of the image sensor 3.

<Second Embodiment>

Next, the image sensor 3 of a second embodiment which is mounted in the digital camera 1 of the present embodiment is described. The image sensor 3 of the second embodiment is an image sensor which can vary the exposure term based on the temperature. In the image sensor 3 of the second embodiment, the pixel chip 31 in the image sensor 3 of the first embodiment illustrated in FIG. 3 is varied. The other components and the operation sequence of the image sensor 3 of the second embodiment are the same as those of the image sensor 3 of the first embodiment. Therefore, in the components of the image sensor 3 of the second embodiment, only the components which are different from those of the image sensor 3 of the first embodiment are described, and regarding the components which are the same as those of the image sensor 3 of the first embodiment, the same references as those of the image sensor 3 of the first embodiment are indicated, and the detail descriptions are omitted.

Figure 8:
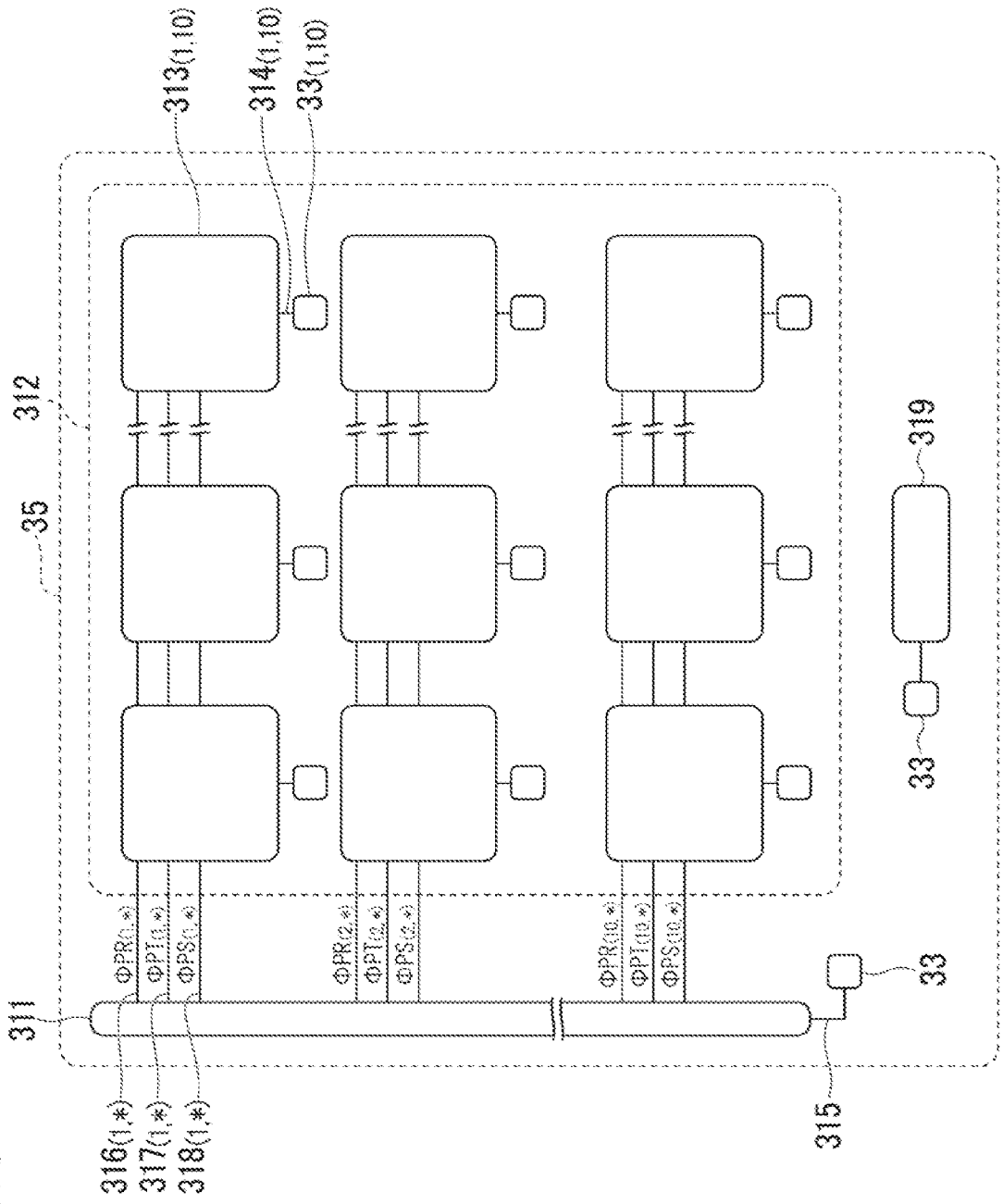
FIG. 8 is a circuit diagram illustrating an outline of a configuration of a pixel chip in an image sensor according to a second embodiment of the present invention.

FIG. 8 is a circuit diagram illustrating an outline of a configuration of the pixel chip in the image sensor 3 according to the second embodiment. In FIG. 8, the pixel chip 35 is configured by a pixel chip vertical scanning circuit 311, a pixel array unit 312, unit pixels 313, pixel signal lines 314, a pixel chip vertical scanning circuit signal line 315, pixel reset lines 316, pixel transfer lines 317, pixel selection line 318, and as temperature sensor 319. Also, in the pixel chip 35 illustrated in FIG. 8, in a similar to the pixel chip 31 illustrated in FIG. 3, an example that a plurality of the unit pixels 313 are two-dimensionally arranged in 10 rows by 10 columns is illustrated. The operations of the same reading timing as that of the first embodiment described above are performed using the configuration of this pixel chip 35.

As can be found from FIG. 8, the pixel chip 35 has the configuration where the temperature sensor 319 is added to the pixel chip 31 illustrated in FIG. 3, The temperature sensor 319 measures the temperature of the pixel chip 35. The temperature measured by the temperature sensor 319 is output as electrical signals, and transmitted to the image sensor control circuit. 329 in the pixel signal processing chip 32 via the chip connection unit 33.

In the image sensor 3 of the second embodiment, the image sensor control circuit 329 determines one exposure term which results in no pixel defects being, caused by dark current (for example, the first exposure term 1005 and the second exposure term 1006 described in the first embodiment and illustrated in FIG. 7) based on the temperature of the pixel chip 35 transmitted from the temperature sensor 319. For example, if the temperature of the pixel chip 35 transmitted from the temperature sensor 2319 is high, the first exposure term is set to a short accumulation time. Furthermore, the image sensor control circuit 329 divides a total exposure term in the long-time exposure into a plurality of exposure terms determined, and controls the operations of the pixel signal processing chip vertical scanning circuit 321, the pixel signal processing chip column processing circuits 326, the pixel signal processing chip horizontal scanning circuit 327, and the pixel chip vertical scanning circuit 311 in the pixel chip 31 in each of the divided exposure terms.

The correlation between the temperature of the pixel chip 35 measured by the temperature sensor 319 and the exposure term is previously set in the image sensor control circuit 329 when the image sensor 3 of the second embodiment is shipped from a factory, etc.

As described above, in the image sensor 3 of the second embodiment, one exposure term which results no pixel defects caused by dark current is determined based on the temperature of the pixel chip 35 measured by the temperature sensor 319. Then, the supply of the lights of the photodiode in the long-time exposure is divided into a number of the exposure terms determined, the divided supplies are executed, the pixel signals achieved in each of the exposure terms are integrated, and the integrated signals are the final pixel signals (memory signals). This makes it possible for, also in the image sensor 3 of the second embodiment, in similar to the image sensor 3 of the first embodiment, the occurrence of the major detects generated h the influence of the pixel defects caused by dark currents on the peripheral parts to be suppressed.

Furthermore, in the image sensor 3 of the second embodiment, one exposure term can be set to an optimum exposure accumulation time based on the temperature of the pixel chip 35 measured by the temperature sensor 319. In the image sensor 3 of the second embodiment, when one image is obtained, this makes it possible for the number of the simultaneous transfer operation of all of the pixels to be set to an optimum number, and the power consumption of the image sensor 3 in the simultaneous transfer operation or all of the pixels to be decreased all the more compared to that of the image sensor 3 of the first embodiment.

In the image sensor 3 of the second embodiment, the ease that the temperature of the pixel chip 35 measured by the temperature sensor 319 is transmitted to the image sensor control circuit 329, and the image sensor control circuit 329 determines one exposure term is described. However, for example a configuration that the camera control device 12 and the image sensor control device 10 determine one exposure term based on the temperature of the pixel chip 35 acquired by the camera control device 12 and the image sensor control device 10 in the digital camera 1, instead of the temperature of the pixel chip 35 measured by the temperature sensor 319, is also possible.

As described above, in accordance with one aspect for implementing the present invention, the supply of the amount of light of the photodiode in the long-time exposure is divided, into a number of exposure terms which result in no pixel defects being caused by dark current, and the divided supplies are executed, then, the pixel signals achieved in each of the exposure terms are integrated, the integrated, signals are the final pixel signals. This makes it possible for, in the solid-state image device formed by connecting a plurality of the chips each other, good images without major defects generated by the influence of the pixel defects caused by dark currents on the peripheral parts to he obtained even if the long-time exposure is performed.

In the present embodiment, the case that the long-time exposure is divided into two long-time exposures and the two long-time exposures are executed is described.

However, the number of the divisions of the exposure term of the long-time exposure is not limited to that of the present embodiment, for example, the exposure term of the long-time exposure is further divided, and the exposure can be executed in three or four times. Furthermore, not only in the long-time exposure, but also, for example, in a normal exposure, the way of thinking of the present invention can he applied if the temperature of the pixel chip is considered be high.

In the present embodiment, the case including the CDS circuit which has the configuration including the first amplifying circuit Amp1 in the unit memory 3 is described, but the configuration of the unit memory 323 is not limited to that of the present embodiment. For example, in the unit memory, the configuration including the CDS circuit which is different from that of the unit memory 323 illustrated in FIG. 6, and the configuration including no CDS circuit are also possible.

The specific configuration of the circuit structure and the driving method of the present invention are not limited to those of the present embodiment, and various modifications are possible without departure from the spirit of the present invention, example, in case that the components and the driving method of the unit pixel and the unit memory are varied, the present invention can be applied by varying the driving method in accordance with the varied components and the circuit structure of the unit pixel and the unit memory. Furthermore, for example, the division number of the divided exposure terms, the number of the pixels, the operation sequence, the number of the unit memory corresponding to each of the unit pixels, the number of the amplifying circuits in the unit memory, the number of shared elements such as the amplifying circuit used in each of the unit pixels and the unit memories, and the method of sharing can he varied accordingly.

The positions of the unit pixels and the unit memories in the row and column directions are limited to those of the present embodiment, the number of each of the rows and columns which the unit pixels and the unit memories are arranged can be varied without departure from the spirit of the present invention.

Hereinbefore, the one aspect of the embodiment of the present invention is described in reference to the figures, but the specific configuration is not limited to that of this embodiment, and various modifications are included without departure from the spirit of the present invention.

Furthermore, in the solid-state image device of the present embodiment, the two substrates may be connected via the connection unit, and three or more of the substrates may be connected via the connection unit. In case of the solid-state image device that three or more of the substrates are connected via the connection units, the two substrates of three or more of the substrates correspond to the first substrate and the second substrate of the claim invention.

What is claimed is:

1. A solid-state imaging device comprising:
   a first substrate;
   a second substrate;
   connection units that electrically connect the first substrate and the second substrate;
   pixels in the first substrate, each pixel comprising a photoelectric conversion element that converts incident lights to signal charges and accumulates the signal charges, and the pixel outputting pixel signals in accordance with the signal charges;
      signal lines that supply the second substrate with the pixel signals via the connection units;
      signal integration units in the second substrate that integrate the pixel signals supplied via the signal lines, and that produce an integrated signal, wherein when the pixel signals are supplied multiple times from the photoelectric conversion element to the signal integration unit, the signal integration unit integrates the pixel signals latterly supplied in the pixel signals previously supplied and integrated by the signal integration unit;
      signal output units that output the integrated signal; and
      a signal supply control unit that controls a period of time and the number of times that the photoelectric conversion elements generate the signal charges to suppress pixel defects caused by dark current.

2. The solid-state imaging device according to claim 1, wherein when the pixel signals are supplied multiple times from the photoelectric conversion element to the signal integration unit, the signal supply control unit controls a period of for each time and the number of times that the photoelectric conversion elements generate the signal charges, and sequentially supplies the signal lines with the pixel signals generated by the pixels under the control.

3. The solid-state imaging device according to claim 2, further comprising:
   a temperature sensor unit that measures the temperature of the first substrate,
   wherein the signal supply control unit decides the period of time and the number of times in accordance with the temperature of the first substrate measured by the temperature sensor unit, and supplies the signal lines by the number of times decided with the pixel signals in accordance with the signal charges which the photoelectric conversion elements continue to generate for the period of time decided.

4. The solid-state imaging device according to claim 1, wherein a current source load is connected to the signal line.

5. The solid-state imaging device according to claim 1, wherein the pixel further comprises:
   a signal charge accumulation unit that accumulates the signal charges generated by the photoelectric conversion element;
   a reset unit that resets the signal charges accumulated in the signal charge accumulation unit;
   a transfer unit that transfers the signal charges to the signal charge accumulation unit; and
   an amplifying unit that amplifies the signal charges accumulated in the signal charge accumulation unit and outputs the amplified signal charges as the pixel signals.

6. The solid-state imaging device according to claim 1, wherein the signal integration unit comprises:
   a pixel signal amplifying unit that outputs amplified pixel signals generated by amplifying the pixel signals;
   a pixel signal accumulation unit that is inserted into an input terminal of the pixel signal amplifying unit, and that accumulates the pixel signals supplied to the signal integration unit; and
   an integration accumulation unit that is inserted between the input terminal and a output terminal of the pixel signal amplifying unit, and that sequentially integrates and accumulates the amplified pixel signals, wherein when the pixel signals are supplied multiple times from the photoelectric conversion element to the signal integration unit, the integration accumulation unit integrates the amplified pixel signals generated from the pixel signals latterly supplied to signal integration unit in the amplified pixel signals generated from the pixel signals previously supplied and integrated by the integration accumulation unit.

7. A method for controlling a solid-state imaging device, the solid-state imaging device comprising:
   a first substrate;
   a second substrate;
   connection units that electrically connect the first substrate and the second substrate;
   pixels in the first substrate, each pixel comprising a photoelectric conversion element that converts incident lights to signal charges and accumulates the signal charges;
   signal integration units in the second substrate;

signal output units that are connected to the signal integration units; and a signal supply control unit that controls the pixels, the method comprising:

a step of controlling, by the signal supply control unit, a period of time and the number of times that the photoelectric conversion elements generate the signal charges to suppress pixel defects caused by dark current, converting incident lights into signal charges and accumulating the signal charges by the photoelectric conversion element, and outputting pixel signals in accordance with the signal charges to signal lines by the pixel, and the signal lines supplying the second substrate with the pixel signals via the connection units;

a step of integrating the pixel signals supplied via the signal lines and forming an integrated signal by the signal integration units, wherein when the pixel signals are supplied multiple times from the photoelectric conversion element to the signal integration unit, the pixel signals latterly supplied are integrated in the pixel signals previously supplied and integrated by the signal integration unit; and a step of outputting the integrated signal from the signal output units.

8. An imaging device comprising:

a first substrate;

a second substrate;

connection units that electrically connect the first substrate and the second substrate;

pixels in the first substrate, each pixel comprising a photoelectric conversion element that converts incident lights to signal charges and accumulates the signal charges, and the pixel outputting pixel signals in accordance with the signal charges;

signal lines that supply the second substrate with the pixel signals via the connection units;

signal integration units in the second substrate that integrate the pixel signals supplied via the signal lines, and that form an integrated signal, wherein when the pixel signals are supplied multiple times from the photoelectric conversion element to the signal integration unit, the signal integration unit integrates the pixel signals latterly supplied in the pixel signals previously supplied and integrated by the signal integration unit;

signal output units that output the integrated signal;

a signal supply control unit that controls a period of time and the number of times that the photoelectric conversion elements generate the signal charges to suppress pixel defects caused by dark current.

9. A solid-state imaging device comprising:

a first substrate;

a second substrate;

connection units that electrically connect the first substrate and the second substrate;

pixels in the first substrate, the pixel comprising a photoelectric conversion element that converts incident lights to signal charges and accumulates the signal charges, and the pixel outputting pixel signals in accordance with the signal charges;

signal lines that supply the second substrate with the pixel signals via the connection units;

signal integration units in the second substrate that integrate the pixel signals supplied via the signal lines, and that produce an integrated signal;

signal output units that output the integrated signal;

a signal supply control unit that controls a period of time and the number of times that the photoelectric conversion elements generate the signal charges, and sequentially supplies the signal lines with the pixel signals generated by the pixels under the control; and a temperature sensor unit that measures the temperature of the first substrate, wherein the signal supply control unit decides the period of time and the number of times in accordance with the temperature of the first substrate measured by the temperature sensor unit, and supplies the signal lines by the number of times decided with the pixel signals in accordance with the signal charges which the photoelectric conversion elements continue to generate for the period of time decided.

\* \* \* \* \*